US012804356B2

(12) United States Patent
Zhang et al.

(10) Patent No.: US 12,804,356 B2
(45) Date of Patent: Nov. 17, 2026

(54) METHODS AND APPARATUS TO DELIVER RELIABLE MULTICAST SERVICES VIA MULTICAST RADIO BEARER (MRB)

(71) Applicant: MediaTek Singapore Pte. Ltd., Singapore (SG)

(72) Inventors: Yuanyuan Zhang, Beijing (CN); Xuelong Wang, Beijing (CN)

(73) Assignee: MEDIATEK Singapore Pte. Ltd, Singapore (SG)

(*) Notice: Subject to any disclaimer, the term of this patent is extended or adjusted under 35 U.S.C. 154(b) by 1084 days.

(21) Appl. No.: 17/504,893

(22) Filed: Oct. 19, 2021

(65) Prior Publication Data

US 2022/0124463 A1 Apr. 21, 2022

Related U.S. Application Data

(63) Continuation of application No. PCT/CN2020/121791, filed on Oct. 19, 2020.

(30) Foreign Application Priority Data

Oct. 9, 2021 (CN) ........................ 202111177971.X

(51) Int. Cl.
*H04W 76/20* (2018.01)
*H04W 4/06* (2009.01)
(Continued)

(52) U.S. Cl.
CPC ............. *H04W 4/06* (2013.01); *H04W 76/20* (2018.02); *H04W 76/30* (2018.02); *H04W 80/02* (2013.01)

(58) Field of Classification Search
CPC .......... H04W 52/0229; H04W 52/0235; H04B 11/00; G06F 3/167; G06F 9/4418;
(Continued)

(56) References Cited

U.S. PATENT DOCUMENTS 12,369,172 B2 * 7/2025 Hori ........................ H04W 4/06
2016/0241413 A1 * 8/2016 Koskinen .............. H04L 12/189
(Continued)

OTHER PUBLICATIONS

China Intellectual Property Office Action, dated Jan. 5, 2023 (5 pages).
(Continued)

*Primary Examiner* — Jay P Patel
*Assistant Examiner* — Shehab A Alawdi
(74) *Attorney, Agent, or Firm* — Helen Mao; Imperium Patent Works

(57) ABSTRACT

Apparatus and methods are provided for the UE MRB configuration, establishment, reconfiguration, and release procedure for reliable MBS. In one novel aspect, the UE performs MRB establishment, release, reconfiguration based on one or more activation, release, and reconfiguration conditions, respectively. In one embodiment, the UE configures a multicast radio bearer (MRB) for one or more MBSs with enabled feedback for the one or more MBSs. The UE establishes an MRB and a UE protocol stack for an active MRB based on the MRB configuration upon detecting one or more activation conditions, wherein the MRB is associated with one or two channels comprising a multicast channel and a unicast channel. In one embodiment, the feedback and retransmission are PDCP-based, with one PDCP entity and one or two RLC entities associated with two logical channels MTCH and DTCH, respectively, for the MRB.

12 Claims, 9 Drawing Sheets

(51) Int. Cl.
*H04W 76/30* (2018.01)
*H04W 80/02* (2009.01)

(58) Field of Classification Search
CPC ......... Y02D 30/70; G10L 15/22; G10L 15/02; G10L 2015/223
See application file for complete search history.

(56) References Cited

U.S. PATENT DOCUMENTS

| | | | | |
|---|---|---|---|---|
| 2017/0295509 | A1* | 10/2017 | Lee | H04B 17/328 |
| 2019/0149958 | A1* | 5/2019 | Zhang | H04W 4/029 455/456.1 |
| 2020/0187170 | A1* | 6/2020 | Shin | H04L 27/2666 |
| 2021/0068003 | A1* | 3/2021 | Kadiri | H04L 1/1812 |
| 2021/0068004 | A1* | 3/2021 | Kadiri | H04W 28/0263 |
| 2021/0126745 | A1* | 4/2021 | Kadiri | H04L 1/1685 |
| 2021/0392467 | A1* | 12/2021 | Kim | H04L 1/1819 |
| 2022/0038866 | A1* | 2/2022 | Kadiri | H04L 1/1816 |
| 2022/0046687 | A1* | 2/2022 | Shrivastava | H04W 72/30 |
| 2023/0023919 | A1* | 1/2023 | Qi | H04W 4/06 |

OTHER PUBLICATIONS

Taiwan Intellectual Property Notice of Allowance, dated Nov. 17, 2022 (3 pages).
Taiwan Intellectual Property Office Action, dated May 5, 2022 (11 pages).
3GPP Aug. 7, 2020, 3GPP R2-2007466, 3GPP TSG-RAN WG2 Meeting #111e Online, "Protocols and Dynamic Switching for 5G MBS PTP and PTM," Lenovo, Motorola Mobility, Aug. 17-18, 2020, p. 1-3.
3GPP Aug. 7, 2020 3GPP R2-2006569, 3GPP TSG-RAN WG2 Meeting #111e Online, "Radio Bearer based Multicast PTM and PTP mode switching," TCL Communication Ltd., Aug. 17-18, 2020 p. 1-5.

* cited by examiner

METHODS AND APPARATUS TO DELIVER RELIABLE MULTICAST SERVICES VIA MULTICAST RADIO BEARER (MRB)

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2020/121791, titled "Methods and apparatus to Deliver Reliable Multicast Services via MRB," with an international filing date of Oct. 19, 2020. This application claims priority under 35 U.S.C. § 119 from Chinese Application Number CN 202111177971.X titled "Methods and apparatus to Deliver Reliable Multicast Services via Multicast Radio Bearer (MRB)" filed on Oct. 9, 2021. The disclosure of each of the foregoing documents is incorporated herein by reference.

TECHNICAL FIELD

The disclosed embodiments relate generally to wireless communication, and, more particularly, to reliable multicast transmission via multicast radio bearer (MRB).

BACKGROUND

With the exponential growth of wireless data services, the content delivery to large mobile user groups has grown rapidly. Initial wireless multicast/broadcast services include streaming services such as mobile TV and IPTV. With the growing demand for large group content delivery, recent application development for mobile multicast services requires highly robust and critical communication services such as group communication in disaster situations and the necessity of public safety network-related multicast services. The early 3GPP in the LTE standard defines enhanced multimedia broadcast multicast services (eMBMS). The single-cell point to multipoint (SC-PTM) services and multicast-broadcast single-frequency network (MBSFN) are defined. The fifth generation (5G) multicast and broadcast services (MBS) are defined based on the unicast 5G core (5GC) architecture. A variety of applications may rely on communication over multicast transmission, such as live stream, video distribution, vehicle-to-everything (V2X) communication, public safety (PS) communication, file download, and so on. In some cases, there may be a need for the cellular system to enable reliable multicast transmission to ensure the reception quality at the UE side. Reliable transmission for some multicast services in the NR system requires feedback on the reception of the multicast transmission, which helps the network to perform necessary retransmission of the content to the UE.

Improvements and enhancements are required to support reliable multicast transmission and reception with multicast radio bearer (MRB).

SUMMARY

Apparatus and methods are provided for the UE MRB configuration, establishment, reconfiguration, and release procedure for reliable MBS. In one novel aspect, the UE applies the MRB establishment procedure to start receiving a session of a multicast service. The UE establishes/adds an MRB when one or more of the activation conditions is met. The UE applies the MRB reconfiguration procedure to switch the MRB type, including the split MRB, the MTCH only MRB, and the DTCH only MRB, for the on-going session of a multicast service. The UE reconfigures/modifies an MRB when one or more of the reconfiguration conditions are met. The UE applies the MRB release procedure to stop receiving a session. The UE releases/removes the MRB when one or more of the release conditions is met.

In one embodiment, the UE configures one or more MRBs in a wireless network, wherein the configured MRB enables feedback for the one or more MBSs. The UE establishes an MRB for an active MBS and a UE protocol stack based on network configuration upon detecting one or more activation conditions, wherein the MRB is associated with one or two channels comprising a multicast channel and a unicast channel, receives data packets of the active MBS through the established MRB in a multi-cast service area comprising one or more serving cells, reconfigures the MRB to change a type of the MRB upon detecting one or more reconfiguration conditions, and releases the MRB upon detecting one or more releasing conditions. In one embodiment, the feedback and retransmission are PDCP-based, with one PDCP entity and one or two RLC entities associated with two logical channels MTCH and DTCH, respectively, for the MRB. The UE configures the MAC entity to map MTCH to MCH and map DTCH to DL-SCH. The UE releases the MRB upon detecting one or more release conditions.

This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Aspects of the present disclosure provide methods, apparatus, processing systems, and computer readable mediums for NR (new radio access technology, or 5G technology) or other radio access technologies. NR may support various wireless communication services, such as enhanced mobile broadband targeting wide bandwidth, milimeter wave targeting high carrier frequency, massive machine type communications targeting non-backward compatible MTC techniques, and/or mission critical targeting ultra-reliable low-latency communications. These services may include latency and reliability requirements. These services may also have different transmission time intervals TTI) to meet respective quality of service (QoS) requirements. In addition, these services may co-exist in the same subframe.

Figure 1:
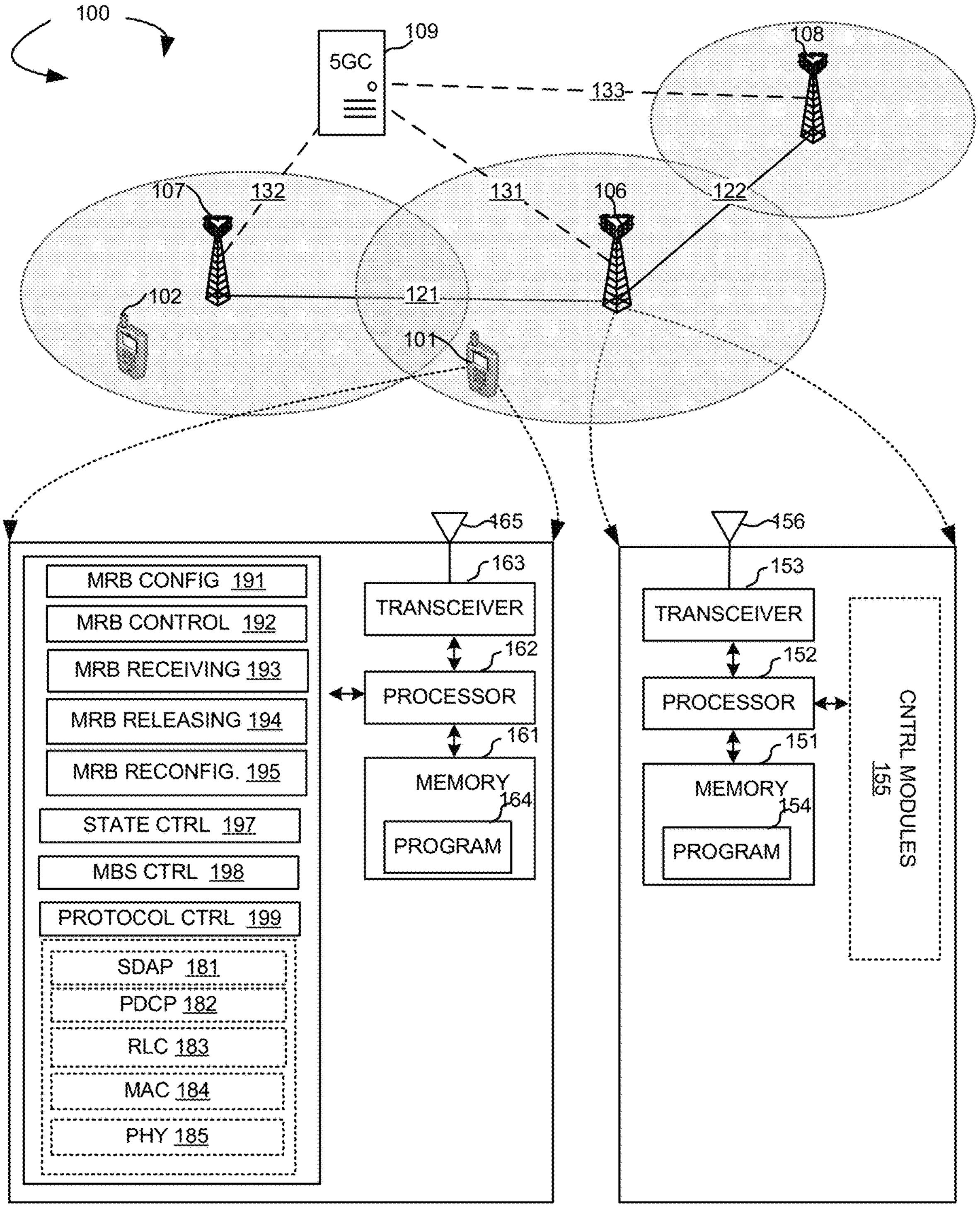
FIG. 1 is a schematic system diagram illustrating an exemplary wireless network that supports reliable multicast transmission for multicast services.

FIG. 1 is a schematic system diagram illustrating an exemplary wireless communication network that supports reliable multicast transmission for multicast services. Wireless communication network 100 includes one or more fixed base infrastructure units forming a network distributed over a geographical region. The base unit may also be referred to as an access point, an access terminal, a base station, a Node-B, an eNode-B (eNB), a gNB, or by other terminology used in the art. As an example, base stations serve a number of mobile stations within a serving area, for example, a cell, or within a cell sector. In some systems, one or more base stations are coupled to a controller forming an access network that is coupled to one or more core networks. gNB 106, gNB 107 and gNB 108 are base stations in the wireless network, the serving area of which may or may not overlap with each other. As an example, user equipment (UE) 101 or mobile station 101 is in the serving area covered by gNB 106 and gNB 107. As an example, UE 101 or mobile station 101 is only in the service area of gNB 106 and connected with gNB 106. UE 102 or mobile station 102 is only in the service area of gNB 107 and connected with gNB 107. gNB 106 is connected with gNB 107 via Xn interface 121. gNB 106 is connected with gNB 108 via Xn interface 122. A 5G network entity 109 connects with gNB 106, 107, and 108 via NG connection 131, 132, and 133, respectively. In one embodiment, gNB 106 and gNB 107 provide the same MBMS services. The service continuity during handover is guaranteed when UE 101 moves from gNB 106 to gNB 107 and vice versa. The area covered by gNB 106 and 107 with the same MBMS services is a multi-cast service area for the MBMS services.

FIG. 1 further illustrates simplified block diagrams of a base station and a mobile device/UE for multicast transmission. gNB 106 has an antenna 156, which transmits and receives radio signals. An RF transceiver circuit 153, coupled with the antenna 156, receives RF signals from antenna 156, converts them to baseband signals, and sends them to processor 152. RF transceiver 153 also converts received baseband signals from processor 152, converts them to RF signals, and sends out to antenna 156. Processor 152 processes the received baseband signals and invokes different functional modules to perform features in gNB 106. Memory 151 stores program instructions and data 154 to control the operations of gNB 106. gNB 106 also includes a set of control modules 155 that carry out functional tasks to communicate with mobile stations. These control modules can be implemented by circuits, software, firmware, or a combination of them.

FIG. 1 also includes simplified block diagrams of a UE, such as UE 101. The UE has an antenna 165, which transmits and receives radio signals. An RF transceiver circuit 163, coupled with the antenna, receives RF signals from antenna 165, converts them to baseband signals, and sends them to processor 162. In one embodiment, the RF transceiver 163 may comprise two RF modules (not shown) which are used for different frequency bands transmitting and receiving. RF transceiver 163 also converts received baseband signals from processor 162, converts them to RF signals, and sends out to antenna 165. Processor 162 processes the received baseband signals and invokes different functional modules to perform features in UE 101. Memory 161 stores program instructions and data 164 to control the operations of UE 101. Antenna 165 sends uplink transmission and receives downlink transmissions to/from antenna 156 of gNB 106.

The UE also includes a set of control modules that carry out functional tasks. These control modules can be implemented by circuits, software, firmware, or a combination of them. An MRB configuration module 191 configures an MRB for one or more multicast and broadcast services (MBSs) in a wireless network, wherein an MRB configuration enables feedback for the one or more MBSs. An MRB control module 192 establishes the MRB and a UE protocol stack for an active MBS based on the MRB configuration upon detecting one or more activation conditions, wherein the MRB is associated with one or two channels comprising a multicast channel and a unicast channel. An MRB receiving module 193 receives data packets of the active MBS through the established MRB in a multi-cast service area comprising one or more serving cells. An MRB releasing module 194 releases the MRB upon detecting one or more releasing conditions. An MRB reconfiguration module 195 reconfigures the MRB to change a type of the MRB upon detecting one or more reconfiguration conditions. In one embodiment, the UE further has an RRC state controller 197, an MBS controller 198 and a protocol stack controller 199. RRC state controller 197 controls UE RRC state according to commands from the network and UE conditions. RRC supports the following states, RRC_IDLE, RRC_CONNECTED and RRC_INACTIVE. In one embodiment, UE can receive the multicast and broadcast services in RRC_IDLE/INACTIVE state. The UE applies the MRB establishment procedure to start receiving a session of a service it has an interest in. The UE applies the MRB release procedure to stop receiving a session. MBS controller 198 controls to establish/add, reconfigure/modify and release/remove a MRB based on different sets of conditions for MRB establishment, reconfiguration, and release. A protocol stack controller 199 manages to add, modify, or remove the protocol stack for the MRB. The protocol Stack includes the packet data convergence protocol (PDCP) layer 182, the radio link control (RLC) 183, the MAC layer 184 and the PHY layer 185. In one embodiment, the service data adaptation protocol (SDAP) layer 181 is optionally configured. In one embodiment, the RLC layer 183 supports the functions of error correction through ARQ, segmentation and reassembly, re-segmentation, duplication detection, re-establishment, etc. In one embodiment, a new procedure for RLC reconfiguration is performed, which can reconfigure the RLC entity to associated to one or two logical channels. In another embodiment, the MAC layer 184 supports mapping between logical channels and transport channels, multiplexing, demultiplexing, HARQ, radio resource selection, and etc.

Figure 2:
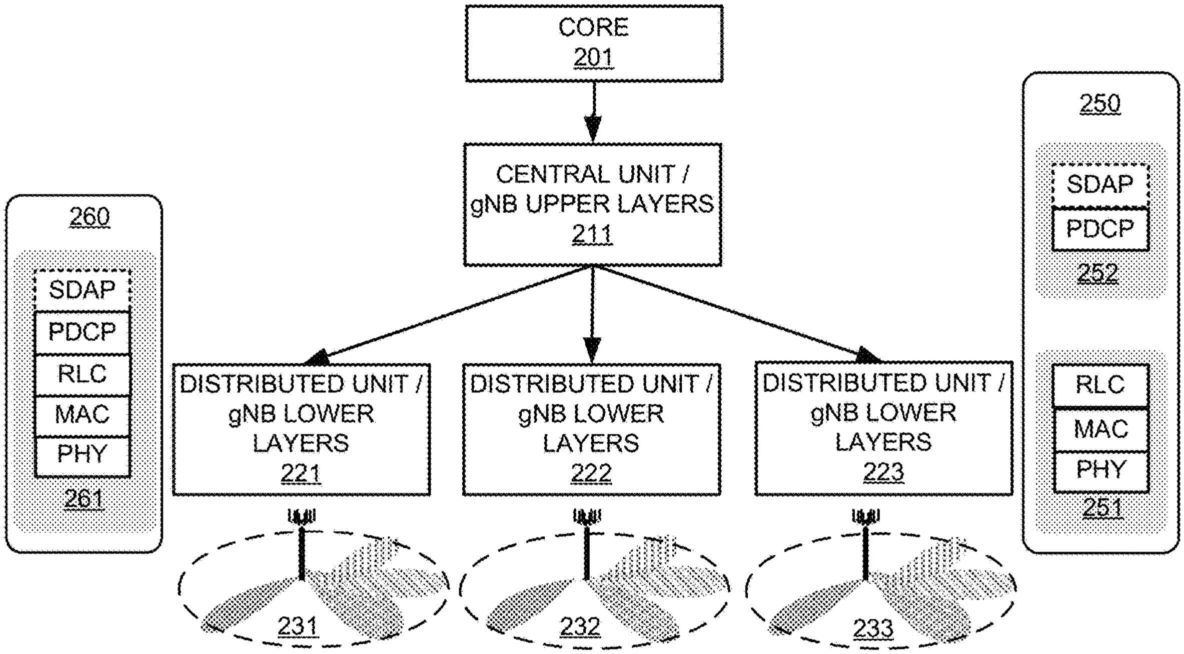
FIG. 2 illustrates an exemplary NR wireless system with centralized upper layers of the NR radio interface stacks.

FIG. 2 illustrates an exemplary NR wireless system with centralized upper layers of the NR radio interface stacks. Different protocol split options between central unit (CU) and distributed unit (DU) of gNB nodes may be possible. The functional split between the CU and DU of gNB nodes may depend on the transport layer. Low performance transport between the CU and DU of gNB nodes can enable the higher protocol layers of the NR radio stacks to be supported in the CU, since the higher protocol layers have lower performance requirements on the transport layer in terms of bandwidth, delay, synchronization, and jitter. In one embodiment, SDAP and PDCP layer are located in the CU, while RLC, MAC and PHY layers are located in the DU. A core unit 201 is connected with one central unit 211 with gNB upper layer 252. In one embodiment 250, gNB upper layer 252 includes the PDCP layer and optionally the SDAP layer. Central unit 211 connects with distributed units 221, 222, and 221. Distributed units 221, 222, and 223 each corresponds to a cell 231, 232, and 233, respectively. The DUs, such as 221, 222 and 223 includes gNB lower layers 251. In one embodiment, gNB lower layers 251 include the PHY, MAC and the RLC layers. In another embodiment 260, each gNB has the protocol stacks 261 including SDAP, PDCP, RLC, MAC and PHY layers.

Figure 3:
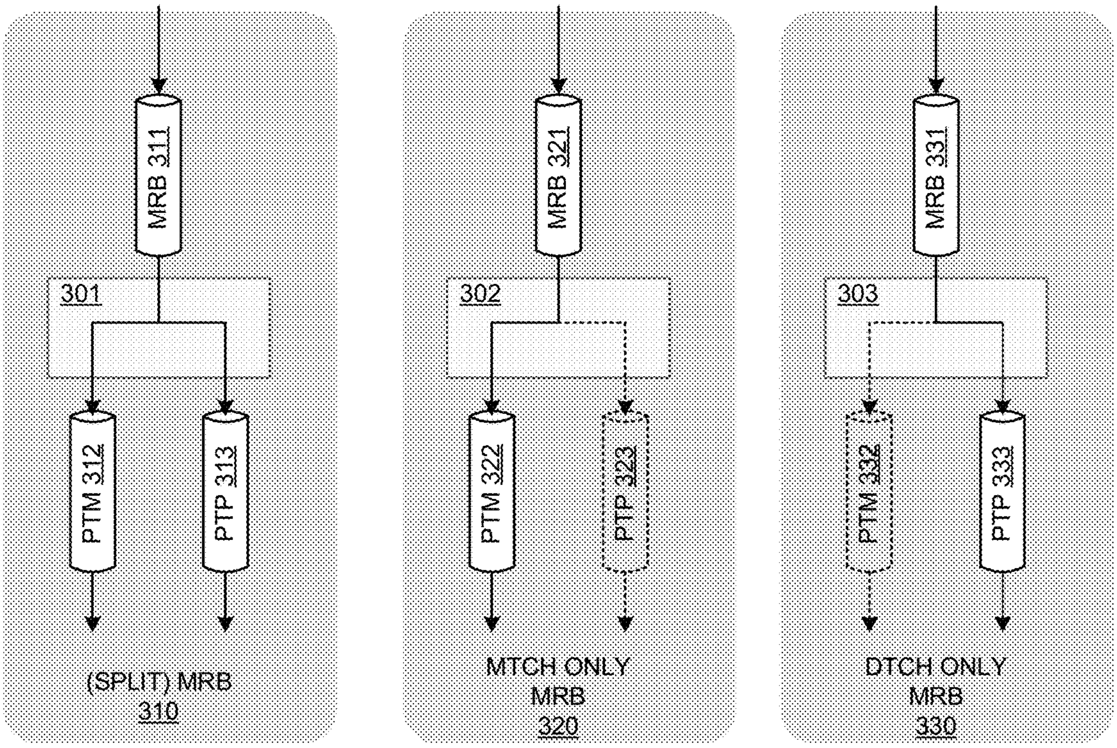
FIG. 3 illustrates exemplary diagrams for different MRB configurations to support the reliable MBS.

FIG. 3 illustrates exemplary diagrams for different MRB configurations to support the reliable MBS. Multicast radio bearer provides multicast service, which is carried by multicast traffic channel (MTCH) only with a UE protocol stack 302, dedicated traffic channel (DTCH) only with a UE protocol stack 303, or both MTCH and DTCH with a UE protocol stack 301. In one embodiment 320, the MRB 321 is configured to be associated to a MTCH. In one embodiment 330, the MRB 331 is configured to be associated to a DTCH. In one embodiment 310, the MRB 311 is configured to be associated to a MTCH and a DTCH. One or multiple multicast MRBs are established corresponding to the multicast flows of a particular multicast session in order to support the multicast transmission in the downlink over the air. The multicast Radio Bearer (i.e., RB) can be subject to PTM transmission and PTP transmission or combination of PTM and PTP transmission within a cell. The different configuration can be described as different transmission modes/channels/MRB types. In one embodiment 310 with split MRB configuration, the MRB 311 is configured in point-to-multipoint (PTM) leg 312 & point-to-point (PTP) leg 313. In another embodiment 320 with MTCH only MRB configuration, the MRB is configured with PTM leg 322 only, the PTP leg 323 is not configured or not activated/established for the MTCH only MRB configuration. In yet another embodiment 330 with DTCH only MRB configuration, the MRB is configured with PTP leg 333 only, the PTM leg 332 is not configured or not activated/established for the DTCH only MRB configuration.

In certain systems, such as NR systems, NR multicast/broadcast is transmitted in the coverage of a cell. In one embodiment, multicast control channel (MCCH) provides the information of a list of NR multicast/broadcast services with ongoing sessions transmitted on MTCH(s). At the physical layer, MTCH is scheduled by gNB in the search space of physical downlink control channel (PDCCH) with group radio network temporary identification (G-RNTI) scrambled. UE decodes the MTCH data for a multicast session in the multicast physical downlink shared channel (PDSCH). In legacy systems supporting MBMS/eMBMS, the radio bearer structure for multicast and broadcast transmission is modelled in an independent way from unicast transmission. Because of the unidirectional transmission for legacy MBMS/eMBMS service, RLC unacknowledged mode (UM) is used for the transmission of multicast/broadcast session. In this case there is no need to make the interaction between multicast and unicast for a particular UE which is in RRC Connected state. For the NR network, with new services provided through MBS, reliable transmission is required. The traditional multicast transmission does not ensure successful reception for all UEs, unless very conservative link adaptations are implemented, which greatly degrades the resource efficiency. To support reliable multicast transmission for MBS, a feedback channel in the uplink is needed for each UE receiving the service, which can be used by the receiving UE to feedback its reception status about the service to the network. Based on the feedback, the network may perform necessary retransmission to improve the transmission reliability. From uplink feedback perspective, the feedback channel may be used for L2 feedback, such as the RLC Status Report and/or the PDCP Status Report. Further, the feedback channel may be used for HARQ feedback. Furthermore, the feedback should be a bidirectional channel between the UE and the network, with the assumption that the network may take that channel to perform needed packet retransmission. The packet retransmission is L2 retransmission (e.g., RLC retransmission and/or PDCP retransmission). In addition, the feedback channel may be used for HARQ retransmission.

Figure 4:
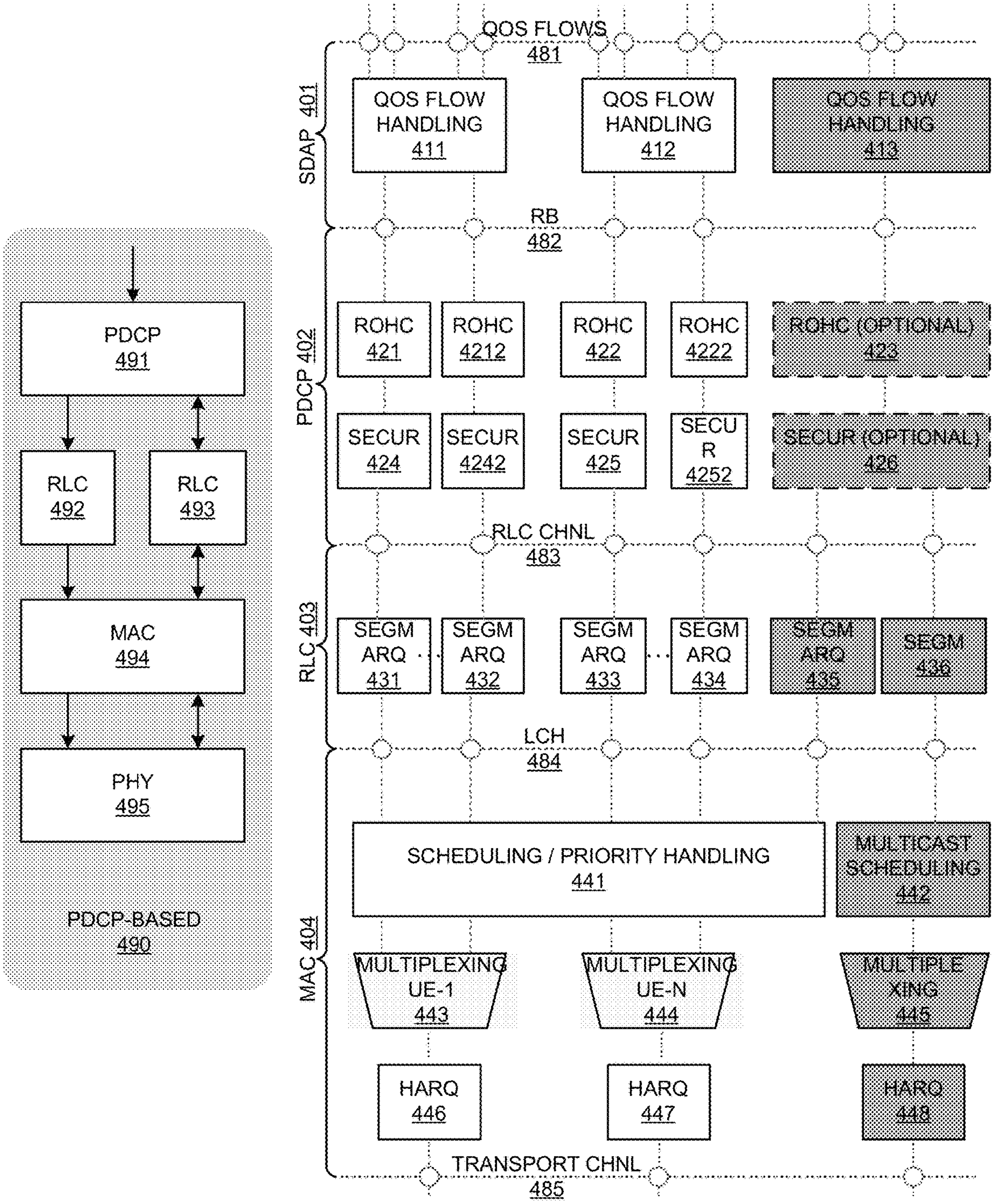
FIG. 4 illustrates an exemplary protocol stack for a MRB configuration with PDCP-based retransmission.

FIG. 4 illustrates an exemplary protocol stack for a MRB configuration with PDCP-based retransmission. In the PDCP-based retransmission 490, there is one PDCP entity 491 per MRB. Two logical channels, i.e., MTCH and DTCH are associated to the PDCP entity. Each logical channel is corresponding to a RLC entity, RLC 492 corresponding to the MTCH and RLC 493 corresponding to the DTCH. From UE aspect, the PDCP status report to trigger PDCP retransmission is delivered to the RLC entity 493 corresponding to DTCH. From network aspect, the PDCP protocol data units (PDUs) subject to retransmission are delivered through DTCH. The MAC entity maps the logical channel MTCH to the transport channel 1 (e.g., MCH, DL-SCH) and maps the logical channel DTCH to the transport channel 2 (e.g., MCH, DL-SCH). UE monitors two independent transport channels via different radio network temporary identifiers (RNTIs). The ROHC function and security function is optional for multicast transmission. The RLC layer includes only segmentation and the ARQ function of RLC layer is moved to PDCP layer. RLC 492 and RLC 493 maps to MAC 494 and send the data packets to PHY 495.

A network entity, such as a base station/gNB, transmits MBS data packets with PTM link to a number N of UEs and retransmits MBS data packets based on feedbacks through associated PTP link with the PDCP-based protocol stack. An exemplary UE, correspondingly configured with PDCP-based protocol stack receives MBS data packets on the PTM RB from the bases station and sends feedback to the base station. The multicast is scheduled independently from PTP transmission. The protocol stack for both the base station and the UE includes SDAP layer 401, PDCP layer 402, RLC layer 403, and MAC layer 404. SDAP layer 401 handles QoS flows 481, including functions at the base station of QoS flow handling 411 for UE-1 and QoS flow handling 412 for UE-N, and functions at the UE of QoS flow handling 413 for the UE. The PDCP layer 402 includes ROHC functions and security functions. The ROHC function and security function is optional for multicast transmission. PDCP layer

402 includes base station functions of ROHC 421 and security 424 for UE-1 multicast, ROHC 4212 and security 4242 for UE-1 unicast, ROHC 422 and security 425 for UE-N multicast, ROHC 4222 and security 4252 for UE-N unicast, and functions at the UE of ROHC 423 and security 426. RBs 482 are handled in PDCP layer 402. The RLC layer 403 includes both segmentation and ARQ function at base Station of segmentation and ARQ 431 for UE-1 multicast, segmentation and ARQ 432 for UE-1 unicast, segmentation and ARQ 433 for UE-N multicast, segmentation and ARQ 434 for UE-N unicast, as well as UE functions of segmentation and ARQ 435 for the unicast channel of the UE, and segmentation and ARQ 436 for the multicast channel. RLC channels 483 are handled in RLC layer 403. MAC layer 404 includes functions of scheduling and priority handling 441 at the base station, multiplexing 443 and HARQ 446 for UE-1 at the base station, multiplexing 444 and HARQ 447 for UE-N at the base station; and functions for the UE of scheduling and priority handling 442 of the UE, multiplexing 445 of the UE and HARQ 448 of the UE. Logic channels 484 and transport channels 485 are handled at MAC layer 404.

Figure 5:
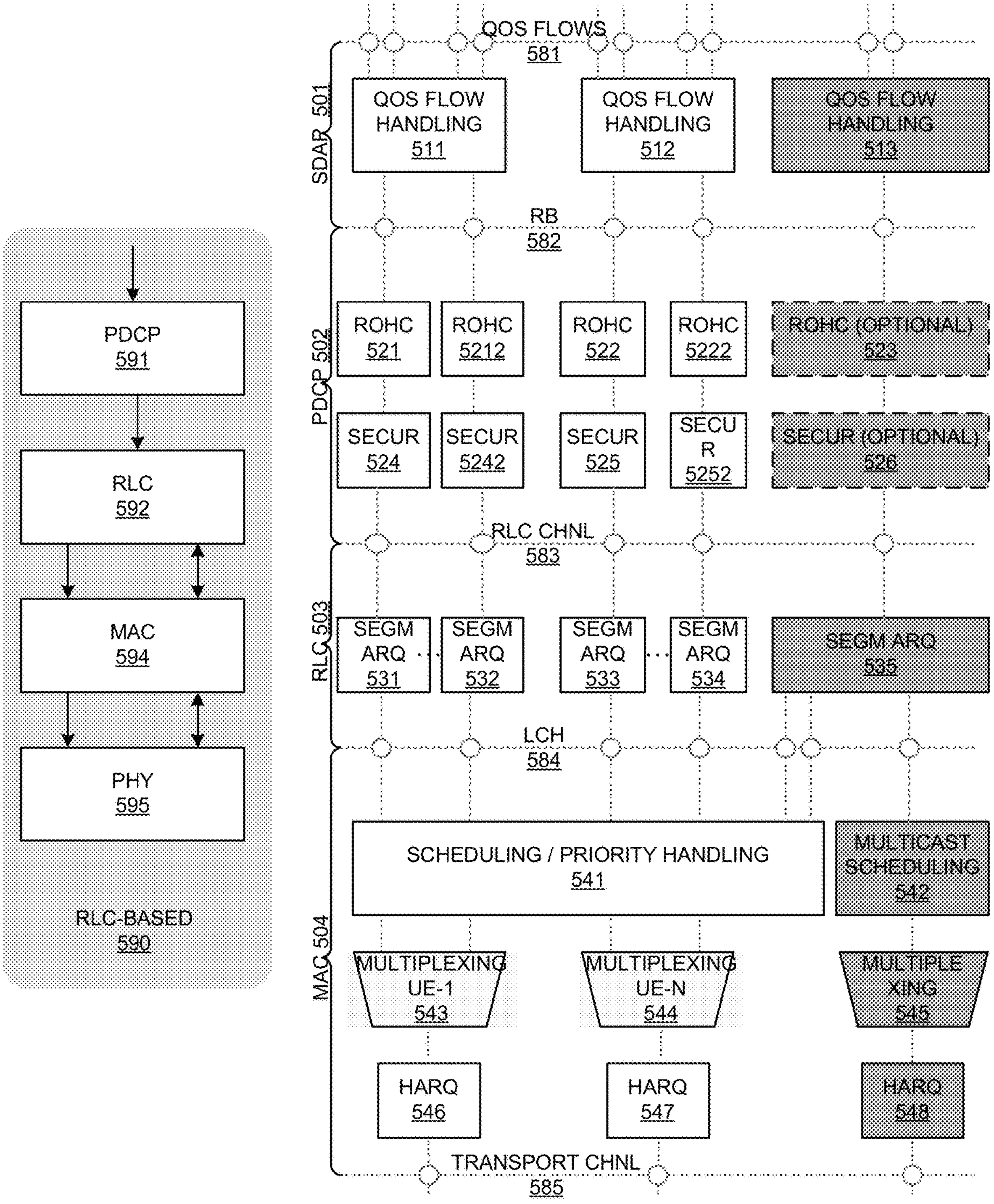
FIG. 5 illustrates an exemplary protocol stack for a MRB configuration with RLC-based retransmission.

FIG. 5 illustrates an exemplary protocol stack for a MRB configuration with RLC-based retransmission. In the RLC-based retransmission 590, there is one PDCP entity 591 and one RLC entity 592 per MRB. One MAC entity 593 and one PHY entity 594 are also included. The RLC entity 592 is associated to two logical channels, i.e., MTCH and DTCH. From UE aspect, the RLC status report to trigger RLC retransmission is delivered through DTCH. From network aspect, the RLC PDUs subject to retransmission are delivered through DTCH. The MAC entity 594 maps the logical channel MTCH to the transport channel 1 (e.g., MCH, DL-SCH) and maps the logical channel DTCH to the transport channel (e.g., DL-SCH, MCH). UE monitors two independent transport channels via different RNTIs.

A network entity, such as a base station/gNB, transmits MBS data packets with PTM RB to a number N of UEs and retransmits MBS data packets based on feedbacks through associated PTP RBs with the RLC-based protocol stack. An exemplary UE, correspondingly configured with RLC-based protocol stack receives MBS data packets on the PTM RB from the bases station and sends feedback to the base station. The multicast is scheduled independently from PTP transmission. The protocol stack for both the base station and the UE includes SDAP layer 501, PDCP layer 502, RLC layer 503, and MAC layer 504. SDAP layer 501 handles QoS flows 581, including functions at the base station of QoS flow handling 511 for UE-1 and QoS flow handling 512 for UE-N, and functions at the UE of QoS flow handling 513 for the UE. The PDCP layer 502 includes ROHC functions and security functions. The ROHC function and security function is optional for multicast transmission. PDCP layer 502 includes base station functions of ROHC 521 and security 524 for UE-1 multicast, ROHC 5212 and security 5242 for UE-1 unicast, ROHC 522 and security 525 for UE-N multicast, ROHC 5222 and security 5252 for UE-N unicast, and functions at the UE of ROHC 523 and security 526. RBs 582 are handled in PDCP layer 502. The RLC layer 503 includes both segmentation and ARQ function at base Station of segmentation and ARQ 531 for UE-1 multicast, segmentation and ARQ 532 for UE-1 unicast, segmentation and ARQ 533 for UE-N multicast, segmentation and ARQ 534 for UE-N unicast, as well as UE functions of segmentation and ARQ 535 of the UE. RLC channels 583 are handled in RLC layer 503. MAC layer 504 includes functions of scheduling and priority handling 541 at the base station, multiplexing 543 and HARQ 546 for UE-1 at the base station, multiplexing 544 and HARQ 547 for UE-1 at the base station; and functions for the UE of scheduling and priority handling 542 of the UE, multiplexing 545 of the UE and HARQ 548 of the UE. Logic channels 584 and transport channels 585 are handled at MAC layer 504.

Figure 6:
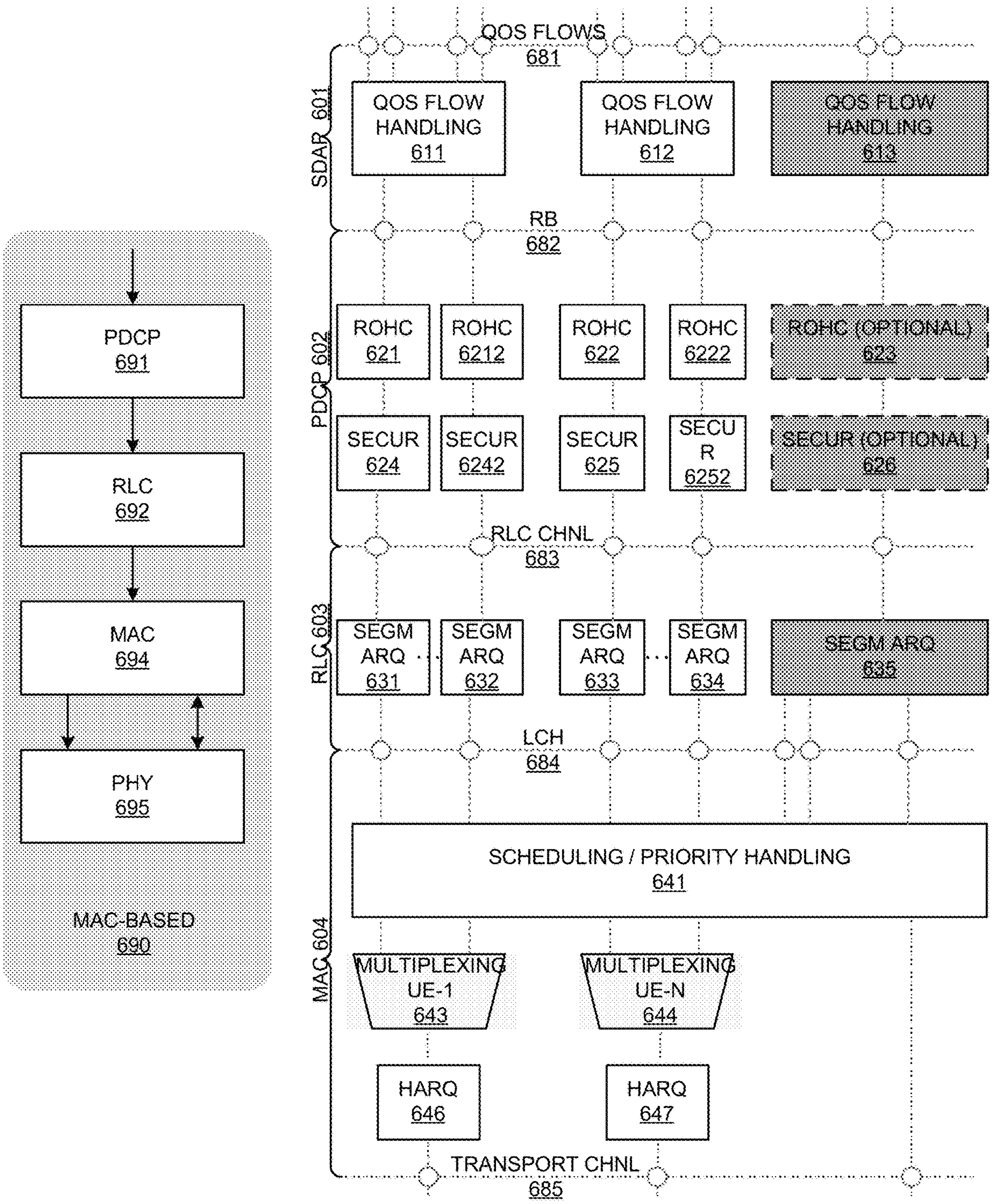
FIG. 6 illustrates an exemplary protocol stack for a MRB configuration with MAC-based retransmission.

FIG. 6 illustrates an exemplary protocol stack for a MRB configuration with MAC-based retransmission. In the MAC-based retransmission 690, there is one PDCP entity 691, one RLC entity 692 per MRB, one MAC entity 694, and one PHY entity 695. The RLC entity 692 is associated to one logical channel, i.e., MTCH. The MAC entity 694 maps the logical channel MTCH to MCH and DL-SCH. MCH is used for initial transmission and optionally retransmission of TBs. DL-SCH is used for retransmission of the TBs. From UE aspect, the HARQ feedback to trigger HARQ retransmission is delivered through UL-SCH. From network aspect, the TBs subject to retransmission are delivered through DL-SCH. UE monitors two independent transport channels via different RNTIs.

A network entity, such as a base station/gNB, transmits MBS data packets with PTM RB to a number N of UEs and retransmits MBS data packets based on feedbacks through associated PTP RBs with the MAC-based protocol stack. An exemplary UE, correspondingly configured with MAC-based protocol stack receives MBS data packets on the PTM RB from the bases station and sends feedback to the base station. The multicast is scheduled independently from PTP transmission. The protocol stack for both the base station and the UE includes SDAP layer 601, PDCP layer 602, RLC layer 603, and MAC layer 604. SDAP layer 601 handles QoS flows 681, including functions at the base station of QoS flow handling 611 for UE-1 and QoS flow handling 612 for UE-N, and functions at the UE of QoS flow handling 613 for the UE. The PDCP layer 602 includes ROHC functions and security functions. The ROHC function and security function is optional for multicast transmission. PDCP layer 602 includes base station functions of ROHC 621 and security 624 for UE-1 multicast, ROHC 6212 and security 6242 for UE-1 unicast, ROHC 622 and security 625 for UE-N multicast, ROHC 6222 and security 6252 for UE-N unicast, and functions at the UE of ROHC 623 and security 626. RBs 682 are handled in PDCP layer 602. The RLC layer 603 includes both segmentation and ARQ function at base Station of segmentation and ARQ 631 for UE-1 multicast, segmentation and ARQ 632 for UE-1 unicast, segmentation and ARQ 633 for UE-N multicast, segmentation and ARQ 634 for UE-N unicast, as well as UE functions of segmentation and ARQ 635 of the UE. RLC channels 683 are handled in RLC layer 603. MAC layer 604 includes functions of scheduling and priority handling 641 at the base station, multiplexing 643 and HARQ 646 for UE-1 at the base station, multiplexing 644 and HARQ 647 for UE-1 at the base station. Logic channels 684 and transport channels 685 are handled at MAC layer 604.

Figure 7:
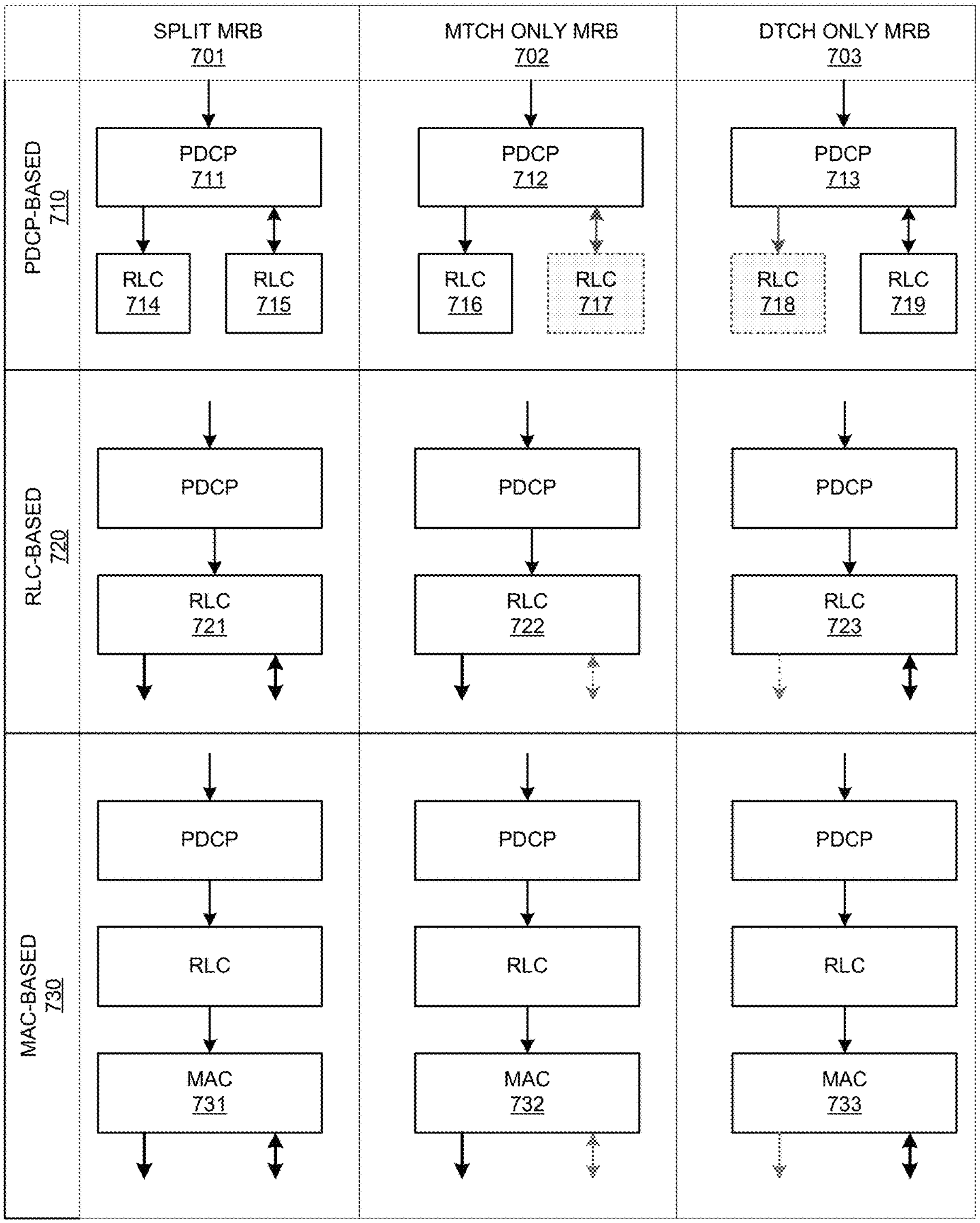
FIG. 7 illustrates exemplary diagrams for MRB configuration establishment for different retransmission configurations.

FIG. 7 illustrates exemplary table diagrams for MRB configuration establishment for different retransmission configurations. The MRB can be configured as a split MRB 701, with both MTCH and DTCH, or a MTCH only MRB 702 with only the MTCH activated/established, or a DTCH only MRB 703 with only the DTCH activated/established. Based on the retransmission layer the MRB can be configured as PDCP-based 710, RLC-based 720, and MAC-based 730. PDCP-based retransmission 710 enables retransmission handling at the PDCP layer to enhance the reliability. In one embodiment, the PCDP-based MRB is configured as split MRB with PDCP entity 711, two RLC entities 714 and 715 associated to MTCH and DTCH, respectively. The PCDP-based MRB can be configured or established as MTCH only MRB, with PDCP entity 712, and one RLC entity 716 associated to MTCH. In the MTCH only mode, the RLC entity 717 associated with the DTCH is either not configured or not being activated/established. The PCDP-based MRB can be configured or established as DTCH only MRB, with PDCP entity 713, and one RLC entity 719 associated to DTCH. In the DTCH only mode, the RLC entity 718 associated with the MTCH is either not configured or not being activated/established.

RLC-based retransmission 720 enables retransmission handling at the RLC layer to enhance the reliability. In one embodiment, the RLC-based MRB is configured as split MRB with one PDCP entity, and one RLC entity 721 associated to MTCH and DTCH. The RLC-based MRB can be configured or established as MTCH only MRB, with one PDCP entity, and one RLC entity 722 associated to MTCH. In the MTCH only mode, the DTCH is either not configured or not being activated/established. The RLC-based MRB can be configured or established as DTCH only MRB, with one PDCP entity, and one RLC entity 723 associated to DTCH. In the DTCH only mode, the MTCH is either not configured or not being activated/established.

MAC-based retransmission 730 enables retransmission handling at the MAC layer to enhance the reliability. In one embodiment, the MAC-based MRB is configured as split MRB with one PDCP entity, one RLC entity, and one MAC entity 731, which maps MTCH to both MCH and DL-SCH. The MAC-based MRB can be configured or established as MTCH only MRB, with one PDCP entity, one RLC entity, and one MAC entity 732, which maps MTCH to MCH. In the MTCH only mode, the DTCH is either not configured or not being activated/established. The MAC-based MRB can be configured or established as DTCH only MRB, with one PDCP entity, one RLC entity, and one MAC entity 733, which maps MTCH to DL-SCH. In the DTCH only mode, the MTCH is either not configured or not being activated/established.

Figure 8:
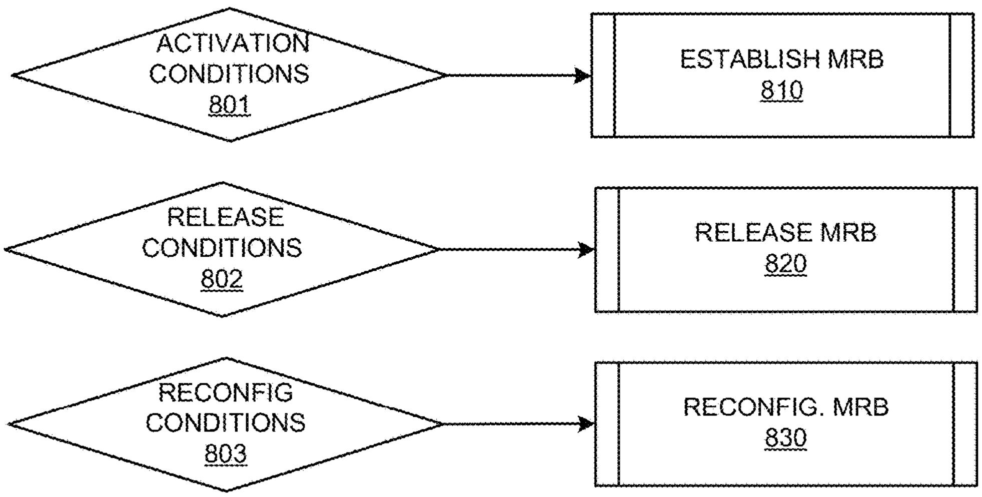
FIG. 8 illustrates top-level exemplary diagrams for MRB establishment, release, and reconfiguration procedures for different retransmission configurations.

FIG. 8 illustrates top-level exemplary diagrams for MRB establishment, release, and reconfiguration procedures for different retransmission configurations. The UE monitors and detects one or more establishment conditions 801 for the MRB configuration. At step 810, upon detecting one or more establishment conditions, the UE can establish an MRB for an active MBS and a UE protocol stack based on the configured MRB, wherein the MRB is associated with one or two channels comprising a multicast channel and/or a unicast channel. The UE applies the MRB establishment procedure to start receiving a session of a multicast service. UE establishes/adds a MRB when one of the establishment conditions is met. The establishment conditions comprise initiating the active MBS, entering the multi-cast service area, re-entering the multi-cast service area, an indication of interest to receive the active MBS, and receiving a command, e.g., RRC reconfiguration message, to establish/add the MRB.

The UE monitors and detects one or more release conditions 802 for the MRB configuration. At step 820, upon detecting one or more release conditions, the UE releases the MRB. The UE applies the MRB release procedure to stop receiving a session. UE releases/removes the MRB when one of the release conditions is met. The release conditions comprise stop of the active MBS, leaving the multi-cast service area, an indication of stop receiving the active MBS, losing interest in the multicast services, receiving a command to release the MRB, and performing a state transition away from a UE CONNECTED state.

The UE monitors and detects one or more reconfiguration conditions 803 for the MRB configuration. At step 830, upon detecting one or more reconfiguration conditions, the UE reconfigures the MRB. The UE applies the MRB reconfiguration procedure to prefer bearer type change to switch the transmission mode (i.e., PTM, PTP or PTM+PTP) for the on-going session of a multicast service. UE reconfigures/modifies the MRB when one of the reconfiguration conditions is met. The reconfiguration conditions comprise performing UE state transition to a UE CONNECTED state and receiving a command to modify/reconfigure the MRB.

Figure 9:
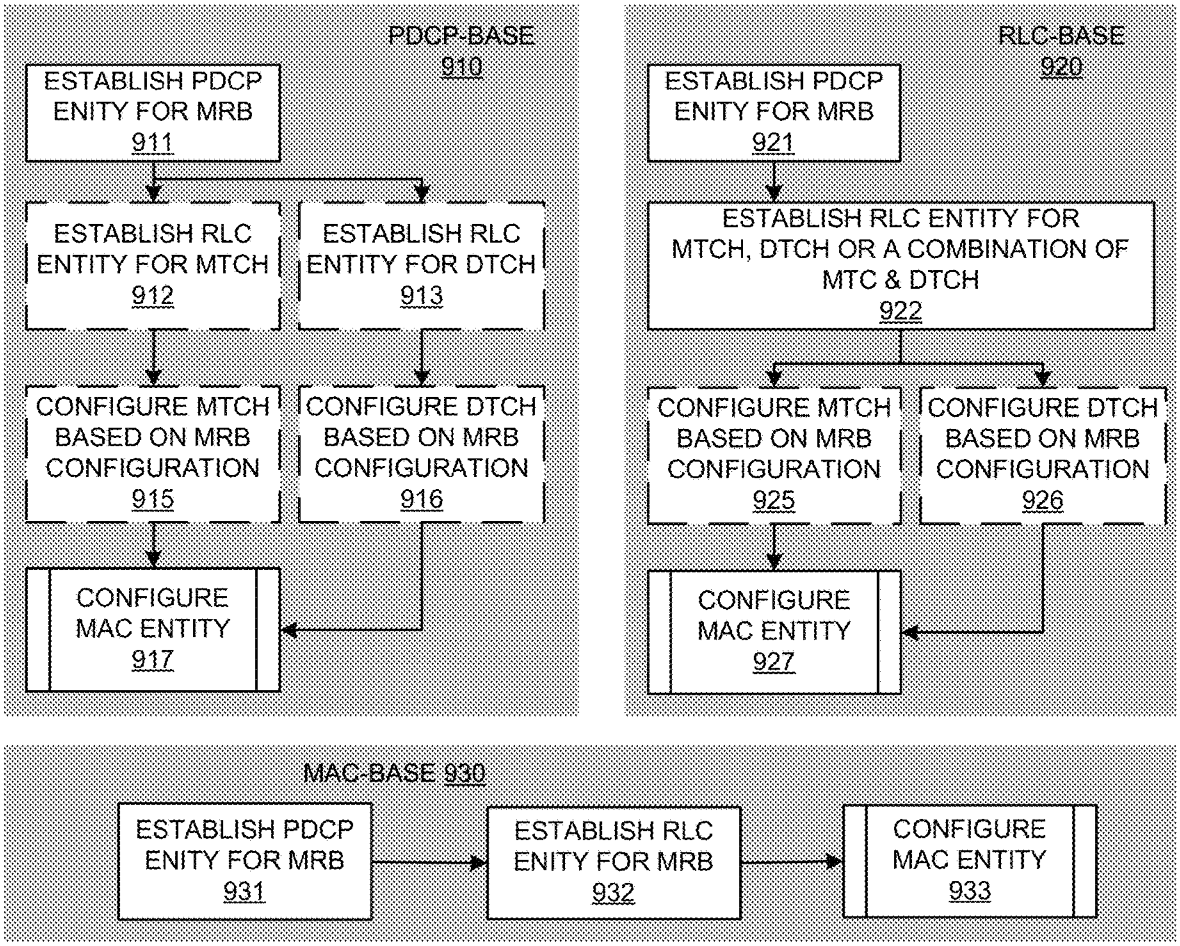
FIG. 9 illustrates exemplary diagrams for MRB establishment procedures for different retransmission configurations.

FIG. 9 illustrates exemplary diagrams for MRB establishment procedures for different retransmission configurations, including the PCDP-based procedure 910, the RLC-based procedure 920, and the MAC-based procedure 930. For PDCP-based retransmission for reliability enhancement 910, at step 911, the UE establishes a PDCP entity for the MRB. The UE either establishes a split MRB, a MTCH only MRB or a DTCH only MRB. At step 912, the UE establishes an RLC entity and configures an MTCH logical channel for the MRB. At step 913, the UE establishes an RLC entity and configures a DTCH logical channel for the MRB. Step 912 is performed for the MTCH only MRB and the split MRB. Step 913 is performed for the DTCH only MRB and the split MRB. The UE establishes two RLC entities and configures two logical channels MTCH, at step 915, and DTCH, at step 916 for the MRB. Step 915 is performed for the MTCH only MRB and the split MRB. Step 916 is performed the DTCH only MRB and the split MRB. At step 917, the UE configures the MAC entity to map MTCH to MCH and/or map DTCH to DL-SCH.

For the RLC-based retransmission procedure 920, at step 921, UE establishes a PDCP entity and a particular RLC entity for the MRB. The UE either establishes a split MRB, a MTCH only MRB or a DTCH only MRB. At step 922, the UE establishes an RLC entity and configures an MTCH, or a DTCH, or both logical channel for the MRB. At step 925, MTCH is configured based on MRB configuration. At step 926, DTCH is configured based on MRB configuration. Step 925 is performed for the MTCH only MRB and the split MRB. Step 926 is performed for the DTCH only MRB and the split MRB. At step 927, the UE configures the MAC entity to map MTCH to MCH and/or map DTCH to DL-SCH.

For MAC-based procedure 930, at step 931, the UE establishes a PDCP entity. At step 932, the UE establishes a RLC entity for the MRB. At step 933, the UE configures the MAC entity to map MTCH to both MCH and DL-SCH.

Figure 10:
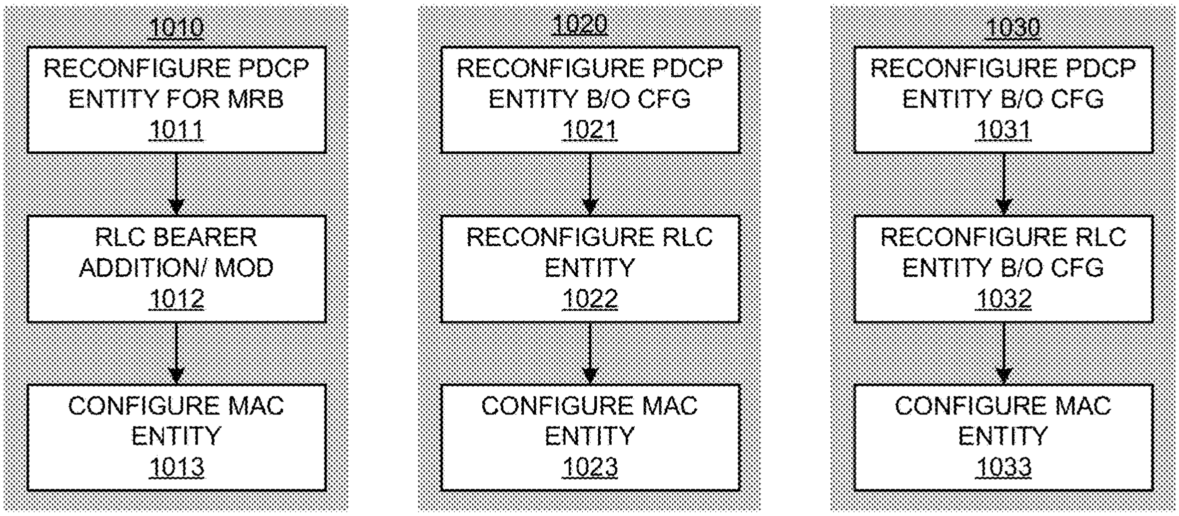
FIG. 10 illustrates exemplary diagrams for MRB reconfiguration procedures for different retransmission configurations.

FIG. 10 illustrates exemplary diagrams for MRB reconfiguration procedures for different retransmission configurations, including a PDCP-based reconfiguration procedure 1010, an RLC-based reconfiguration procedure 1020, and a MAC-based reconfiguration procedure 1030. For PDCP-based retransmission for reliability enhancement 1010, at step 1011, the UE reconfigures the PDCP entity for MRB according to the configuration, e.g., pdcp-config. At step 1012, the UE performs RLC bearer addition/modification based on the configuration, e.g., RLC-BearerConfig. As a result, the PDCP entity is reconfigured as one of the following three options: one RLC entity for MTCH, one RLC entity for DTCH, or two RLC entities for MTCH and DTCH respectively for the MRB. For MRB reconfiguration, the change among the three options is performed. The UE associates the logical channel with the PDCP entity identified by servedRadioBearer if a logical channel with the given logicalChannelIdentity is not configured before. At step 1013, the UE configures MAC entity for the logical channel according to the configuration, e.g., mac-Logical-ChannelConfig.

For the RLC-based retransmission procedure 1020, at step 1021, the UE reconfigures the PDCP entity for MRB according to the configuration, e.g., pdcp-config. At step 1022, the UE performs RLC bearer reconfiguration based on the configuration, e.g., RLC-BearerConfig. As a result, the RLC entity is associated to one or two logical channels, i.e. MTCH, DTCH or both DTCH and MTCH. For RLC reconfiguration, the change between the association to MTCH, DTCH and both MTCH and DTCH is performed. At step 1023, the UE configures MAC entity for the logical channel according to the configuration, e.g., mac-LogicalChannel-Config.

For MAC-based retransmission procedure 1030, at step 1031, the UE reconfigures the PDCP entity for MRB according to the configuration, e.g., pdcp-config. At step 1032, the UE performs RLC bearer addition/modification based on the configuration, e.g., RLC-BearerConfig. At step 1033, the UE configures MAC entity for the logical channel according to the configuration, e.g., mac-LogicalChannelConfig. As a result, the MAC entity is associated to one or two transport channels, i.e., MCH, DL-SCH or both MCH and DL-SCH.

Figure 11:
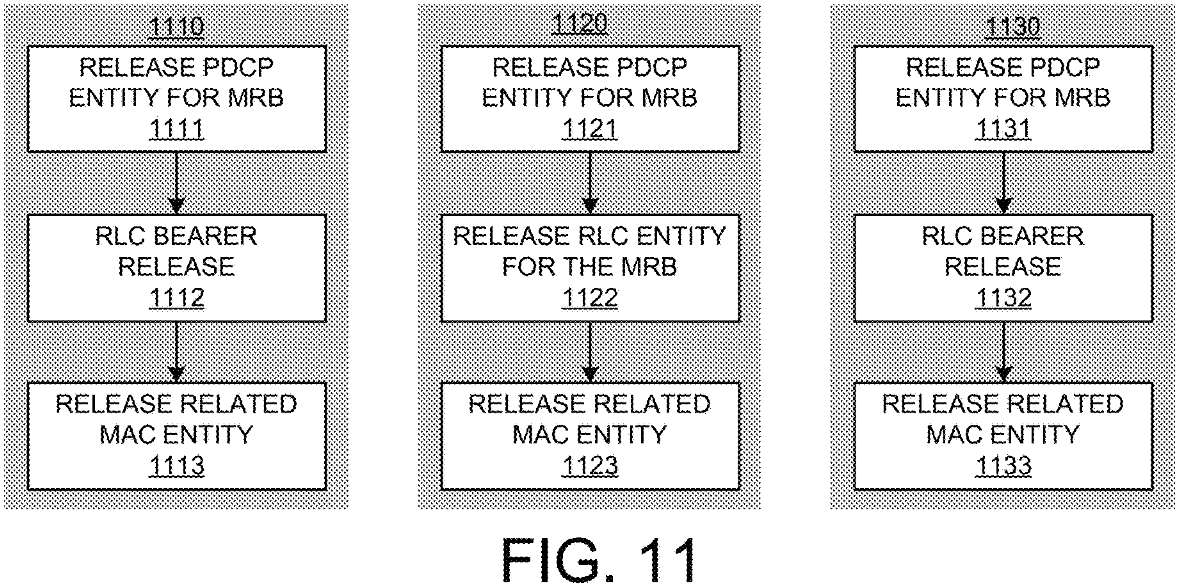
FIG. 11 illustrates exemplary diagrams for MRB configuration release procedures for different retransmission configurations.

FIG. 11 illustrates exemplary diagrams for MRB configuration release procedures for different retransmission configurations, including PDCP-based release procedure 1110, RLC-based release procedure 1120, and MAC-based release procedure 1130. For PDCP-based retransmission for reliability enhancement, at step 1111, the UE release a PDCP entity for the MRB. At step 1112, the UE releases one or two RLC entities and the associated logical channels. At step 1113, the UE releases the MAC configuration for the MRB. For RLC-based retransmission for reliability enhancement, at step 1121, the UE releases a PDCP entity for the MRB. At step 1122, the UE releases the RLC entity and the associated one or two logical channels. At step 1123, the UE releases the MAC configuration for the MRB. For MAC-based retransmission for reliability enhancement, at step 1131, the UE releases a PDCP entity for the MRB. At step 1132, the UE releases the RLC entity and the associated logical channel, i.e., MTCH. At step 1133, the UE releases the MAC configuration for the MRB.

Figure 12:
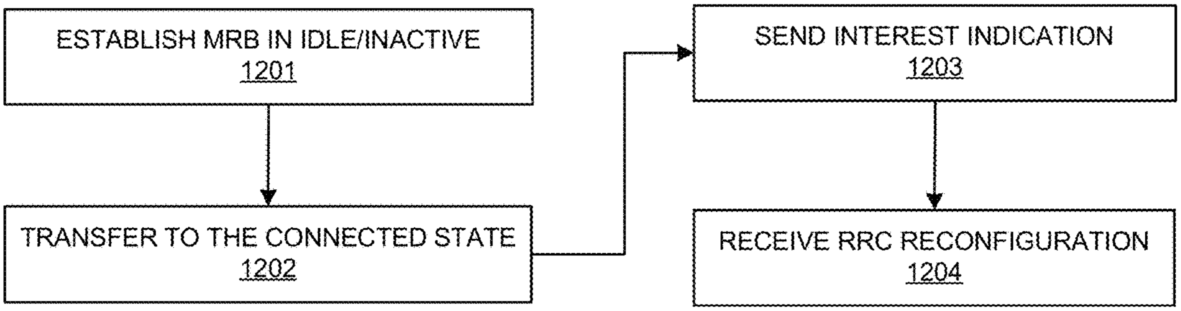
FIG. 12 illustrates an exemplary flowchart to perform MRB reconfiguration during RRC state from IDLE/INACTIVE to CONNECTED.

FIG. 12 illustrates an exemplary flowchart to perform MRB reconfiguration during RRC state transition from IDLE/INACTIVE to CONNECTED. At step 1201, the UE establishes a MRB in IDLE/INACTIVE for a multicast service. At step 1202, the UE transfers to CONNECTED mode for the unicast services. At step 1203, the UE sends the multicast interest indication to the network, informing which multicast service is on-going or it is interested in. At step 1204, the UE receives the RRC reconfiguration message to reconfigure the MRB as a response to the interest indication. The UE subsequently performs an MRB reconfiguration based on the RRC reconfiguration message.

Figure 13:
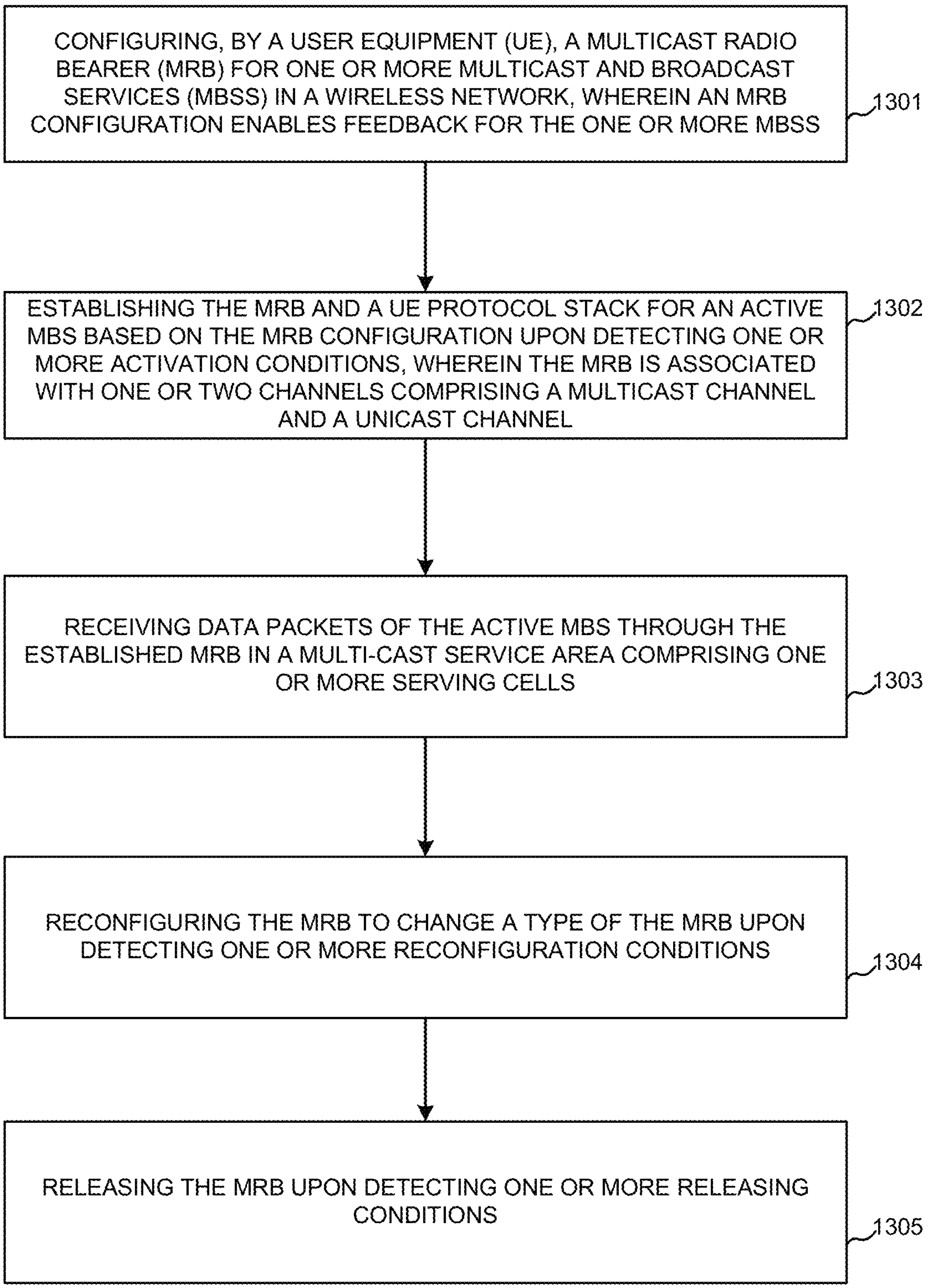
FIG. 13 illustrates an exemplary flowchart for the UE MRB configuration, establishment, reconfiguration, and release procedures for reliable MBS.

FIG. 13 illustrates an exemplary flowchart for the UE MRB configuration, establishment, reconfiguration, and release procedures for reliable MBS. At step 1301, the UE configures a multicast radio bearer (MRB) for one or more multicast and broadcast services (MBSs) in a wireless network, wherein an MRB configuration enables feedback for the one or more MBSs. At step 1302, the UE establishes the MRB and a UE protocol stack for an active MBS based on the MRB configuration upon detecting one or more activation conditions, wherein the MRB is associated with one or two channels comprising a multicast channel and a unicast channel. At step 1303, the UE receives data packets of an active MBS through the established MRB in a multicast service area comprising one or more serving cells. At step 1304, the UE reconfigures the MRB to change a type of the MRB upon detecting one or more reconfiguration conditions. At step 1305, the UE releases the MRB upon detecting one or more releasing conditions.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:

configuring, by a user equipment (UE), a multicast radio bearer (MRB) for one or more multicast and broadcast services (MBSs) in a wireless network, wherein an MRB configuration enables feedback for the one or more MBSs, and wherein the MRB is configured with a type comprising a split MRB, a multicast traffic channel (MTCH) type, or a dedicated traffic channel (DTCH) type;

establishing the MRB and a UE protocol stack for an active MBS based on the MRB configuration upon detecting one or more activation conditions, wherein the MRB is associated with one or two channels comprising a multicast channel and a unicast channel, and wherein the configured MRB enables feedback for the active MBS with a packet data convergence protocol (PDCP)-based retransmission, and wherein the UE protocol stack includes one MRB PDCP entity, and wherein the activation conditions comprising: initiating the active MBS, entering the multi-cast service area, re-entering the multi-cast service area, an indication of interest to receive the active MBS, and receiving a command to establish the MRB;

receiving data packets of the active MBS through the established MRB in a multi-cast service area comprising one or more serving cells;

reconfiguring the MRB to change the type of the MRB upon detecting one or more reconfiguration conditions, wherein the reconfiguration conditions comprising performing UE state transition to a UE CONNECTED state and receiving a command to modify the MRB; and upon detecting one or more releasing conditions, releasing the MRB by: releasing the MRB PDCP entity for the MRB; releasing corresponding one or two RLC entities for the MRB; and releasing associated one or two logic channels for the MRB.

2. The method of claim 1, wherein the release conditions comprising: stop of the active MBS, leaving the multi-cast service area, losing interest in multicast services, an indication of stop receiving the active MBS, receiving a command to release the MRB, and performing a state transition away from a UE CONNECTED state.

3. The method of claim 1, wherein the MRB is established with a multicast channel and a unicast channel, and wherein the UE protocol stack further includes two radio link control (RLC) entities that one for multicast data packets of the multicast channel and one for unicast data packets of the unicast channel.

4. The method of claim 1, wherein the MRB is established with a single channel selecting from a multicast channel and a unicast channel, and wherein the UE protocol stack further includes one RLC entity.

5. The method of claim 1, wherein the configured MRB enables feedback for the active MBS with a PDCP-based retransmission, and wherein the UE protocol stack includes one MRB PDCP entity, and wherein the reconfiguring the MRB comprising reconfiguring the MRB PDCP entity to update one or two corresponding RLC entities accordingly for the MRB.

6. The method of claim 1, wherein the MRB is established in a UE IDLE or INACTIVE state, further comprising:
transitioning to a UE CONNECTED state;
sending an indication of interest in the one or more MBS;
receiving an RRC reconfiguration message of an MRB reconfiguration for the MRB; and
performing the MRB reconfiguration based on the RRC reconfiguration message.

7. A user equipment (UE), comprising:
a transceiver that transmits and receives radio frequency (RF) signal in a wireless network;
a multicast radio bearer (MRB) configuration module that configures an MRB for one or more multicast and broadcast services (MBSs) in the wireless network, wherein an MRB configuration enables feedback for the one or more MBSs, and wherein the MRB is configured with a type comprising a split MRB, a multicast traffic channel (MTCH) type, or a dedicated traffic channel (DTCH) type;
an MRB control module that establishes an MRB for an active MBS and a UE protocol stack based on the configured MRB upon detecting one or more activation conditions, wherein the MRB is associated with one or two channels comprising a multicast channel and a unicast channel, and wherein the configured MRB enables feedback for the active MBS with a packet data convergence protocol (PDCP)-based retransmission, and wherein the UE protocol stack includes one MRB PDCP entity, and wherein the activation conditions comprising: initiating the active MBS, entering the multi-cast service area, re-entering the multi-cast service area, an indication of interest to receive the active MBS, and receiving a command to establish the MRB;
an MRB receiving module that receives data packets of the active MBS through the established MRB in a multi-cast service area comprising one or more cells;
an MRB reconfiguration module that reconfigures the MRB to change the type of the MRB upon detecting one or more reconfiguration conditions, wherein the reconfiguration conditions comprising performing UE state transition to a UE CONNECTED state and receiving a command to modify the MRB; and
an MRB releasing module that upon detecting one or more releasing conditions releases the MRB by releasing the MRB by: releasing the MRB PDCP entity for the MRB; releasing corresponding one or two RLC entities for the MRB; and releasing associated one or two logic channels for the MRB.

8. The UE of claim 7, wherein the release conditions comprising: stop of the active MBS, leaving the multi-cast service area, losing interest in multicast services, an indication of stop receiving the active MBS, receiving a command to release the MRB, and performing a state transition away from a UE CONNECTED state.

9. The UE of claim 7, wherein the MRB is established with a multicast channel and a unicast channel, and wherein the UE protocol stack further includes two radio link control (RLC) entities that one for multicast data packets of the multicast channel and one for unicast data packets of the unicast channel.

10. The UE of claim 7, wherein the MRB is established with a single channel selecting from a multicast channel and a unicast channel, and wherein the UE protocol stack further includes one RLC entity.

11. The UE of claim 7, wherein the configured MRB enables feedback for the active MBS with a PDCP-based retransmission, and wherein the UE protocol stack includes one MRB PDCP entity, and wherein the reconfiguring the MRB comprising reconfiguring the MRB PDCP entity to update one or two corresponding RLC entities accordingly for the MRB.

12. The UE of claim 7, wherein the MRB is established in a UE IDLE or INACTIVE state, the UE transitions to a UE CONNECTED state; sends an indication of interest in the one or more MBS; receives an RRC reconfiguration message of an MRB reconfiguration for the MRB; and performs the MRB reconfiguration based on the RRC reconfiguration message.

* * * * *